Nov. 15, 1932.  E. CHAPMAN  1,888,027
WELDED BLANK FOR MACHINE ELEMENTS AND THE
LIKE AND METHOD OF MAKING THE SAME
Filed July 22, 1931    2 Sheets-Sheet 1

INVENTOR:
Everett Chapman,
by Murray C. Boyer
Atty.

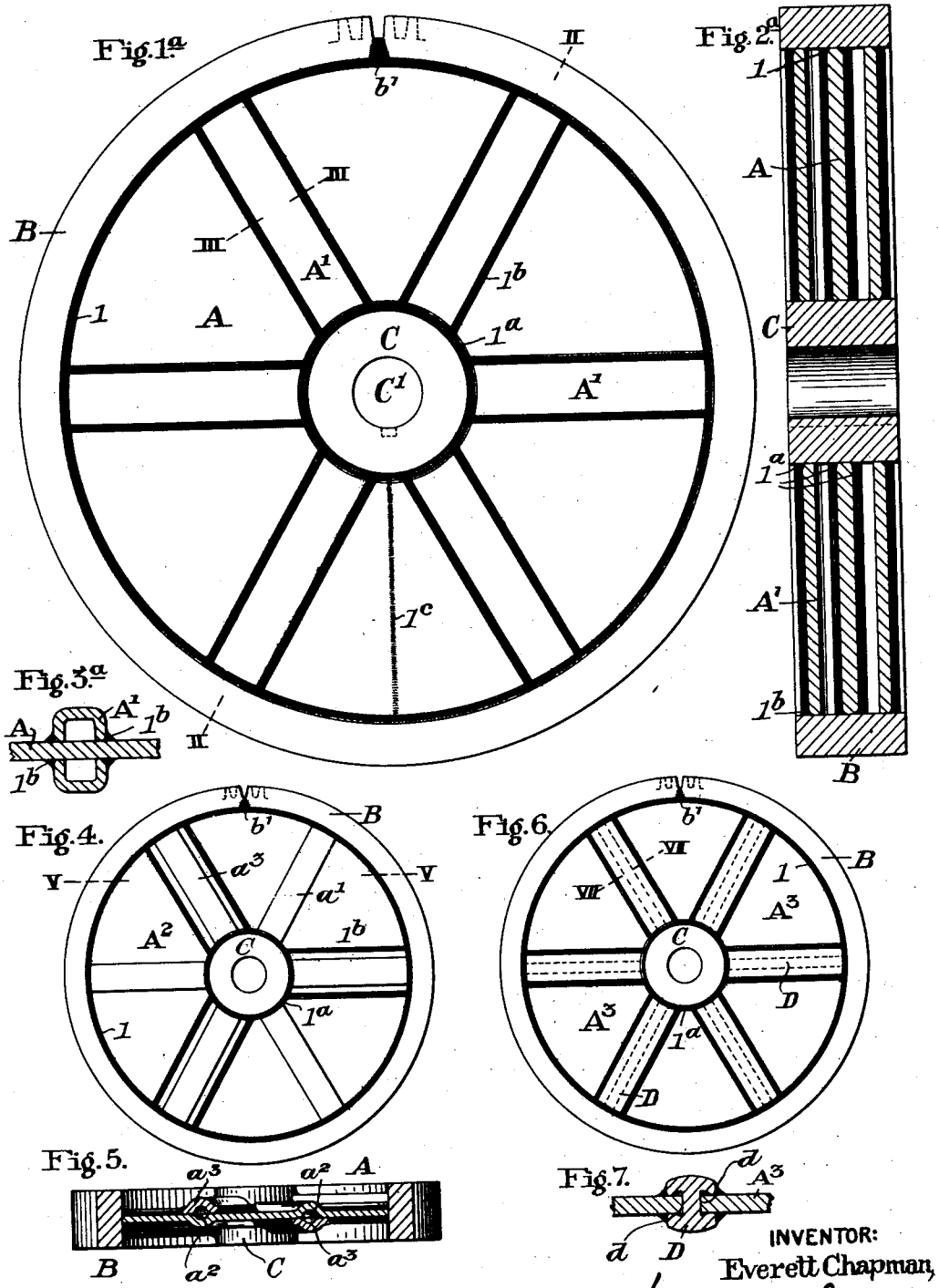

Patented Nov. 15, 1932

1,888,027

UNITED STATES PATENT OFFICE

EVERETT CHAPMAN, OF COATESVILLE, PENNSYLVANIA, ASSIGNOR TO LUKENWELD, INC., OF COATESVILLE, PENNSYLVANIA, A CORPORATION OF PENNSYLVANIA

WELDED BLANK FOR MACHINE ELEMENTS AND THE LIKE AND METHOD OF MAKING THE SAME

Application filed July 22, 1931. Serial No. 552,356.

My invention relates to the manufacture of blanks and other shapes available for development into various forms of machine elements, which may include gear and other wheels, pulleys, fly-wheels and/or the like, and the main object of my invention is to develop a blank structure of built-up elements or members from sections of plate or sheet metal and/or other rolled shapes or sections, which elements or members may be welded together in final form, or into blank form to be subsequently manipulated or operated upon for the manufacture of many forms of machine elements.

Another object of my invention is to reinforce certain of the portions or sections making up such welded blanks.

Another object of my invention is to position the weld of a rim or flange section with respect to teeth which may be subsequently cut in said rim or flange whereby the adjacent ends of a discontinuous section forming such rim or flange may serve as the walls of the space between adjacent teeth.

And a still further object of my invention is to subject the finally welded blank or other structure to an annealing treatment after the welding operations have been completed.

These and other features of my invention are more fully described hereinafter; reference being had to the accompanying drawings, more or less diagrammatic in character, in which.

Figure 1:
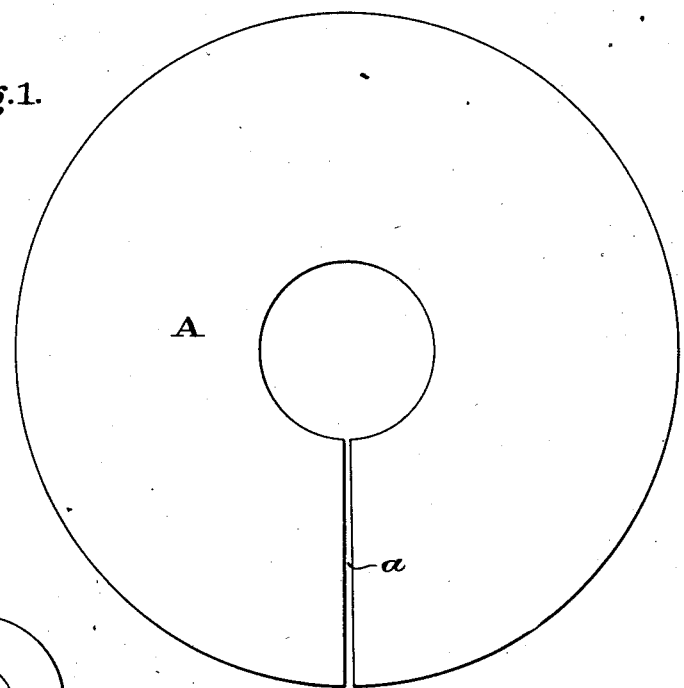
Figure 1 is a face view of one element which may be employed in the construction of one form of welded blank in accordance with my invention.
Figure 3:
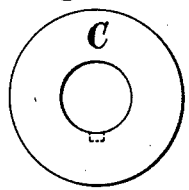
Fig. 3 is a face view of a hub element for assembly with the elements shown in Figs. 1 and 2, in the formation of one form of welded blank in accordance with my invention.
Figure 2:
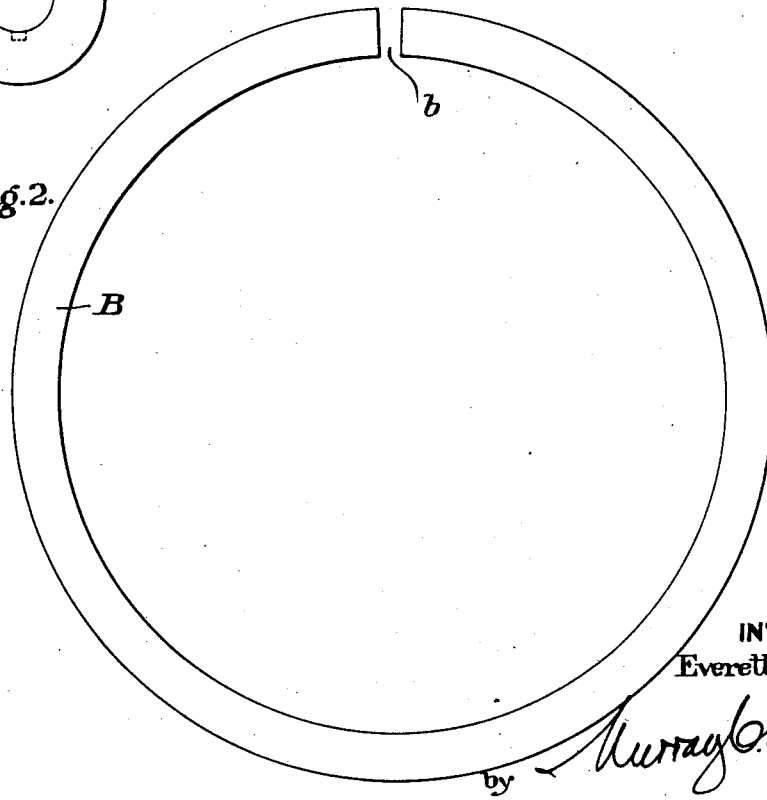
Fig. 2 is a face view of another element, a rim or flange, which may be assembled with the element illustrated in Fig. 1, in the formation of one form of welded blank in accordance with my invention.

Fig. 1ᵃ is a view in elevation of one form of complete blank made in accordance with my invention and assembled from elements such as those indicated in Figs. 1, 2 and 3.

Fig. 2ᵃ is a sectional view on the line II—II, Fig. 1ᵃ.

Fig. 3ᵃ is a sectional view on the line III—III, Fig 1ᵃ.

Fig. 4 is a view in elevation, on a slightly smaller scale, of another form of welded blank within the scope of my invention.

Fig. 5 is a sectional view on the line V—V, Fig. 4.

Fig. 6 is a view similar to Fig. 4, showing another form of welded blank within the scope of my invention, and Fig. 7 is an enlarged sectional view on the line VII—VII, Fig. 6.

In the production of blanks for various types of machine elements, such as gear blanks and other circular or wheel blanks, and/or the like, from assembled sections of metal by a series of welding operations, I may employ a set of elements such as illustrated at A, B and C, in Figs. 1, 2 and 3. The element A may be a section of sheet or plate metal of a gauge suitable for the blank desired. This plate is centrally apertured and, by preference, is slit between such central opening and its marginal edge, as indicated at $a$, to avoid the setting up of strains which would be occasioned if a continuous plate had to be forced into place in a continuous rim or if a hub had to be forced into a central opening of such continuous plate. By slitting the plate A in the manner indicated, it permits ready insertion of the hub and then by manipulation of the plate to bring the edges of the slit toward each other it may be slightly contracted and more readily inserted in the complete rim during construction of the desired blank involving assembly of a rim and hub and a connecting web such as the plate A interposed between such parts and subsequently welded thereto. Moreover, by slitting the plate A, some degree of over or under size of the respective parts may be compensated for; permitting ready fitting of the same during assembly. The element B, to serve as a rim or flange for the finished blank, may be formed into the desired shape from bar metal by any suitable means, or cut from sheet stock of the desired thickness. This element is preferably discontinuous and the meeting ends, originally separated as indicated at $b$, may be welded together before it is assembled with the plate web element A, or after such assembly. The element C, to serve as a hub for the finished blank is inserted in the central opening of the plate web element A, before or after assembly with the rim element B.

The completed blank shown in Fig. 1ª, which is especially adapted for the production of gear wheels, may be assembled from elements of the character shown in Figs. 1, 2 and 3, comprising a web A, rim or flange B, and hub C. The plate A, which forms the main web of the blank and the finished gear wheel, preferably occupies a position midway between the outer surfaces of the rim or flange B, and midway of the ends of the hub C, as clearly shown in Fig. 2ª, and these parts may be welded together along the lines 1 and 1ª, respectively. The rim or flange B, which may be a section of rolled metal bent into ring-form or cut in ring-form from rolled sheets or plates of the desired thickness, occupies the proper position relatively to the plate web A, as shown in Fig. 2ª, and may be welded thereto as indicated at 1. The hub C, which may be made from rolled metal or shaft stock, or be in the form of a drop forging, casting, and/or the like, is preferably of uniform section throughout, and preferably of a truly circular external surface, with a bore C' concentric therewith which may be finished in exact axial relation to the rim or flange B. This hub is disposed in the central opening of the plate web element A concentrically with respect to the flange or rim B, and is welded to the web plate A at the point 1ª.

The rim or flange B, comprising a section or strip of metal bent or otherwise formed into ring shape for attachment to the plate web A, or otherwise prepared, may have its meeting ends welded together at the point $b'$, and the outwardly disposed portions of such meeting ends, beyond the weld, may be left open to serve as the walls of the recess between adjacent teeth, if such blank is subsequently developed into a gear wheel by any usual method of cutting teeth on the same.

For the purpose of reinforcing and staying the plate web A between the rim or flange B and the hub C, I may provide such plate web with a series of radially disposed ribs A' which may be in the form of short channel sections placed on opposite sides of said plate web and in registry with each other, as clearly indicated in Figs. 2ª and 3ª; such channel sections being welded to the hub, the web and the rim along the lines 1ᵇ. After assembly of the several elements and the completion of the several welding operations, the slit $a$ in the plate web A may be closed by a welding operation, as indicated at 1ᶜ, Fig. 1ª. If desired, this closure may be effected before the last set of channel sections A' is applied, and these sections may be so spaced that one set of the same will overlie and conceal the weld 1ᶜ.

The blanks so made, as hereinbefore described, are, in all instances, subjected to an annealing heat whereby any strain or stress set up during the process of manufacturing the same may be relieved. When the blanks have been removed from the annealing furnace and cooled they are ready to be further operated upon, as by cutting teeth in the rim or flange B by suitable means, in addition to forming a key-way in the opening of the hub C.

It will be understood, of course, that I do not wish to be limited to the precise form of blank illustrated in Figs. 1ª, 2ª and 3ª, and in Figs. 4, 5, 6 and 7, I have shown constructions of blanks made from assembled sections, welded together, within the scope of my invention.

In the form of blank illustrated in Figs. 4 and 5, the plate A², serving as the web, is upset or otherwise shaped to form a series of radial ribs $a'$ on one side of the same and a series of grooves $a^2$ on the opposite side of the same, in alternate relation; the marginal edges of such plate A² being attached to the rim or flange B and the hub C by welding in a manner precisely similar to the structure illustrated in Figs. 1ª and 2ª. For the purpose of further reinforcing the plate A² constituting the web, the side opposite the ribs $a'$ of the same may be provided with semicircular metal members $a^3$, radially disposed, which may be welded to said web, as well as to the hub and flange, along the lines 1ᵈ. In lieu of this arrangement and as a further modification within the scope of my invention, the web plate A² may be shaped so that the ribs $a'$ are all on one side or face of the same and the grooves $a^2$ are on the other face of the web, opposite said ribs. In this instance, the semicircular members $a^3$ would be applied to one face of the web, over the grooves $a^2$ and welded thereto in a manner exactly similar to the arrangement illustrated in Fig. 5.

A further modification of my invention consists in providing a sectional web, in which the sections are locked together and welded. In the structure illustrated in Figs. 6 and 7, the web is in the form of independent sections A³ of segmental shape which are secured together into complete circular plate form by means of lock-bar members D, substantially I-shape in cross section and having oppositely disposed channels $d$ into which the edges of the segmental web sections A³ may enter, as clearly shown in Fig. 7. This built-up web may then be pressed together so as to bring the connecting lock-bar members in close contact with the segmental web sections $A^3$; the several elements being subsequently welded together along the lines $1^e$ in a manner precisely similar to the constructions illustrated in the other figures of the drawings. The outer marginal edge of this built-up web structure may then be secured to a rim or flange B, and internally to a hub C, by welding operations in a manner precisely similar to the operations of welding described with respect to the other forms of blanks illustrated.

It will be understood that any form of welding operation, electrical or otherwise, may be employed in securing the several elements together to form the desired blanks. It will also be understood that the built-up blanks are subjected to an annealing heat to relieve stresses or strains set up during manufacture.

Fig. $1^a$ shows, by dotted lines, the manner in which teeth may be cut in the rim or flange B to form a gear wheel, and it will be noted that the welded portion of the meeting ends of such rim element, indicated at $b'$, is arranged to lie at the root of one of the recesses between a pair of the teeth.

I claim:

1. As a new article of manufacture, a built-up blank comprising a circular flat metal plate, a central hub, a solid rim concentric therewith; said plate engaging said rim midway of its lateral surfaces and being welded at its marginal edges to said hub and rim, and hollow reinforcing ribs radially disposed between said hub and rim and having their ends welded to said parts and their longitudinal portions welded to said circular plate.

2. As a new article of manufacture, a built-up blank comprising a circular metal plate having a central aperture, a centrally disposed hub fitting said aperture, a rim concentric with said hub; said plate being welded at its inner and outer marginal edges to said hub and rim, and reinforcing ribs of channel section radially disposed between said hub and rim and having their ends welded to said parts and their flanges welded to said circular plate.

3. As a new article of manufacture, a built-up blank comprising a circular plate forming a web and having a central opening, a hub fitting said opening and welded thereto, a rim comprising a strip of metal formed into ring shape and welded together at its meeting ends; said rim being welded midway of its lateral surfaces to the outer edge of said circular plate, and a series of channel-shape reinforcing ribs radially disposed between said hub and rim and having their ends welded to said parts and their flanges welded to said circular plate.

4. In a structure such as set forth in claim 3, disposing the channel-shaped reinforcing ribs on opposite sides of the circular plate in registering alignment.

5. As a new article of manufacture, a built-up wheel blank comprising a circular metal plate having a central opening and having its body reinforced by upsetting the metal thereof in radial lines to form a series of ribs; the metal on the opposite sides of said ribs being grooved, a central hub fitting the central aperture of the plate, a rim concentric with said hub; said plate being welded on both sides of its inner and outer marginal edges to the hub and rim respectively, and a series of radially disposed hollow members overlying the groves of the plate and having their edges welded thereto and their ends welded to the rim and hub.

6. The method of manufacturing built-up wheel blanks, which consists in forming a circular plate with a central opening and a radial slot between such opening and its marginal edge, applying a hub to the central opening of said plate and welding the same thereto, providing a section of metal in ring-form to serve as a rim, placing said circular plate within said rim while the radial slot is still open and welding the same to said plate, and thereafter welding the radial slot of the web between said rim and the hub.

7. The method of manufacturing built-up wheel blanks, which consists in forming a circular plate with a central opening and a radial slot between such opening and its marginal edge, applying a hub to said central opening and welding the same thereto, providing a discontinuous section of metal in ring-form to serve as a rim and welding its meeting ends to form such rim, placing said circular plate within said rim while the radial slot is still open and welding said rim to the plate, welding the radial slot of the plate between said rim and the hub, and thereafter annealing said built-up blank to remove any stresses or strains set up during assembly and the welding of the respective sections together.

In witness whereof, I have signed this specification.

EVERETT CHAPMAN.